R. A. WILDER.

Machines for Breaking Coal and Other Substances.

No. 136,887. Patented March 18, 1873.

Witnesses
A. B. Cochran
John H. Strauch

Inventor
R. A. Wilder

UNITED STATES PATENT OFFICE.

RUFUS A. WILDER, OF CRESSONA, PENNSYLVANIA.

IMPROVEMENT IN MACHINES FOR BREAKING COAL AND OTHER SUBSTANCES.

Specification forming part of Letters Patent No. 136,887, dated March 18, 1873.

*To all whom it may concern:*

Be it known that I, RUFUS A. WILDER, of Cressona, in the county of Schuylkill and State of Pennsylvania, have invented certain Improvements in Machines for Breaking Coal and other Substances, of which the following is a specification:

My invention relates to the form of teeth of a coal-breaking machine, and the method of inserting and holding them on the face of a rotating cylinder by means of movable plates arranged between the rows of teeth; and which also form the wearing-face of the cylinder itself. The object of my invention is to furnish a breaking-machine where the parts subject to the greatest wear and liability to breakage can be readily repaired or renewed without taking apart or removing the entire machine.

Figure 1:
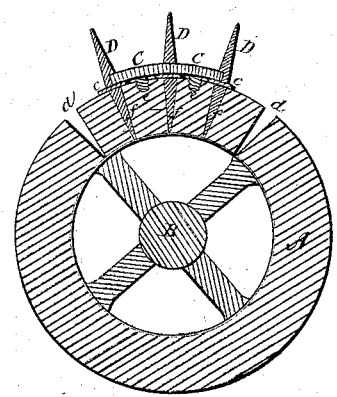
Figure 2:
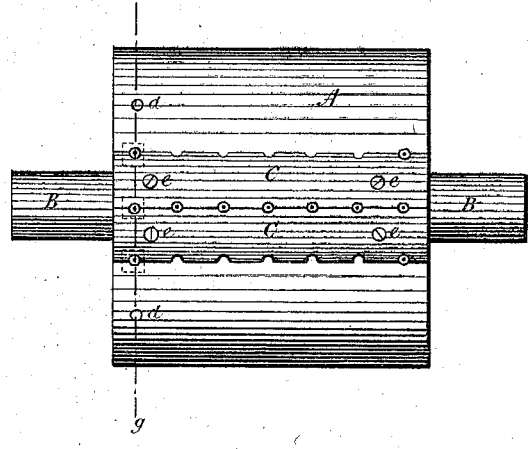

Figure 1 is a transverse section of the machine embodying my invention through the line $g\,g$ in Fig. 2. Fig. 2 is a plan of the machine, showing the face of the cylinder and method of attaching the movable plates.

A is the cylinder, which may be made solid or in parts, and bolted together. B B are the journals. D D D are the teeth, made tapering from the center each way, and provided with flanges $c\,c\,c$ at their thickest part, which serve as a seat for them on the face of the cylinder, and to carry the movable plates that press upon and hold the teeth in place. $d\,d$ are tapering recesses or sockets in the cylinder, in which the teeth are inserted. C C are movable plates, extending the length of the cylinder, and arranged between the teeth in such manner by their notched and beveled edges, and resting on the flanges $c\,c\,c$, that they are made to hold the teeth securely in their sockets. They also serve to form the wearing-surface of the cylinder. $e\,e$ are screw-bolts passing through the movable plates into the cylinder to compress and hold the parts together. $f\,f\,f$ are the portions of the teeth inserted in the tapering sockets; and, as exhibited here, are formed exactly like the portions extending outward from the face of the machine, so that when the latter are worn out or broken above the plates C C they can be reversed, and the part $f$ used for breaking.

The following is the method of putting the parts of this machine together: When the cylinder is placed in position two rows of the teeth are inserted, and then one of the plates is placed between them and bolted down. Then another row of teeth and another plate are put in place and secured; and this process is continued until the teeth and plates are arranged around the entire face of the cylinder.

In the accompanying drawing only a sufficient number of each of the parts are shown to illustrate the method, as all the others will be precisely similar.

I do not limit myself to the method of making the movable plates with notched edges to fit the sides of the teeth, as it is evident that holes for them may be made along the center of the plate. Nor do I confine myself to making the plates with plain surfaces, as they may be curved to fit the face of the cylinder, and ribbed to give them greater strength. Neither do I limit myself to arranging them longitudinally, as shown, for it will be seen that the same object can be accomplished by bending them to the circle of the cylinder and placing them around its face between circular rows of teeth. I use the methods shown in preference because, practically, they are more convenient.

I make no claim to the general form of a coal-breaking cylinder, for I am aware that this is not new; but

I claim as my invention—

1. The teeth constructed as described, with a flange in their center, and tapering from such flange toward each end, as and for the purposes specified.

2. The plates constructed as described, and arranged between the rows of teeth, as and for the purposes specified.

3. In a coal-breaking machine the teeth, constructed as described, in combination with the plates and rotating cylinder, as and for the purposes specified.

R. A. WILDER.

Witnesses:
CHAS. W. DENGLER,
D. G. SMITH.